(12) United States Patent
Wang et al.

(10) Patent No.: US 8,095,635 B2
(45) Date of Patent: Jan. 10, 2012

(54) MANAGING NETWORK TRAFFIC FOR IMPROVED AVAILABILITY OF NETWORK SERVICES

(75) Inventors: Jia Wang, Randolph, NJ (US); Zihui Ge, Florham Park, NJ (US); Hongbo Jiang, Cleveland, OH (US); Shudong Jin, Solon, OH (US); Andrew W. Moore, Cambridge (GB)

(73) Assignee: AT&T Intellectual Property I, LP, Atlanta, GA (US)

( * ) Notice: Subject to any disclaimer, the term of this patent is extended or adjusted under 35 U.S.C. 154(b) by 715 days.

(21) Appl. No.: 12/176,539

(22) Filed: Jul. 21, 2008

(65) Prior Publication Data

US 2010/0014420 A1  Jan. 21, 2010

(51) Int. Cl.
 *G06F 13/00* (2006.01)
(52) U.S. Cl. .................................... 709/223
(58) Field of Classification Search .............. 709/223
 See application file for complete search history.

(56) References Cited

U.S. PATENT DOCUMENTS

| | | | |
|---|---|---|---|
| 5,720,003 A | 2/1998 | Chiang et al. | |
| 6,012,152 A | 1/2000 | Douik et al. | |
| 6,862,500 B2 | 3/2005 | Tzamaloukas | |
| 6,907,436 B2 | 6/2005 | Ye et al. | |
| 6,925,378 B2 | 8/2005 | Tzamaloukas | |
| 6,941,467 B2 | 9/2005 | Judge et al. | |
| 6,993,532 B1 | 1/2006 | Platt et al. | |
| 7,024,424 B1 | 4/2006 | Platt et al. | |
| 7,076,365 B2 | 7/2006 | Tzamaloukas | |
| 7,089,590 B2 | 8/2006 | Judge et al. | |
| 7,096,498 B2 | 8/2006 | Judge | |
| 7,124,438 B2 | 10/2006 | Judge et al. | |
| 7,188,026 B2 | 3/2007 | Tzamaloukas | |
| 7,213,023 B2 | 5/2007 | Hadzikadic et al. | |
| 7,213,260 B2 | 5/2007 | Judge | |
| 7,225,343 B1 | 5/2007 | Honig et al. | |
| 7,225,466 B2 | 5/2007 | Judge | |
| 7,272,586 B2 | 9/2007 | Nauck et al. | |
| 7,295,831 B2 | 11/2007 | Coleman et al. | |
| 7,296,031 B1 | 11/2007 | Platt et al. | |
| 7,660,248 B1* | 2/2010 | Duffield et al. ............ 370/230.1 |

OTHER PUBLICATIONS

T. Karagiannis, K. Papagiannaki, and M. Faloutsos. BLINC: multi-level traffic classification in the dark. In Proceedings of ACM SIGCOMM 2005, pp. 229-240, 2005.

Lakhina, M. Crovella, and C. Diot. Diagnosing network-wide traffic anomalies. In Proceedings of ACM SIGCOMM 2004, pp. 219-230, Sep. 2004.

(Continued)

*Primary Examiner* — Robert B Harrell
(74) *Attorney, Agent, or Firm* — Hoffmann & Baron, LLP

(57) ABSTRACT

Managing network traffic to improve availability of network services by classifying network traffic flows using flow-level statistical information and machine learning estimation, based on a measurement of at least one of relevance and goodness of network features. Also, determining a network traffic profile representing applications associated with the classified network traffic flows, and managing network traffic using the network traffic profile. The flow-level statistical information includes packet-trace information and is available from at least one of Cisco NetFlow, NetStream or cflowd records. The classification of network flows includes tagging packet-trace flow record data based on defined packet content information. The classifying of network flows can result in the identification of a plurality of clusters based on the measurement of the relevance of the network features. Also, the classification of network traffic can use a correlation-based measure to determine the goodness of the network features.

17 Claims, 3 Drawing Sheets

OTHER PUBLICATIONS

Lakhina, M. Crovella, and C. Diot. Mining anomalies using traffic feature distributions. In Proceedings of ACM SIGCOMM 2005, pp. 217-228, 2005.

Moore, J. Hall, C. Kreibich, E. Harris, and I. Pratt. Architecture of a network monitor. In Proceedings of Passive & Active Measurement Workshop 2003 (PAM2003), La Jolla, CA, Apr. 2003.

W. Moore and D. Papagiannaki. Toward the accurate identification of network applications. In Proceedings of the Sixth Passive and Active Measurement Workshop (PAM 2005), vol. 3431. Springer-Verlag LNCS, Mar. 2005.

W. Moore and D. Zuev. Internet traffic classification using Bayesian analysis techniques. In Proceedings of ACM Sigmetrics, pp. 50-60, 2005.

D. Moore, K. Keys, R. Koga, E. Lagache, and K. C. Claffy. CoralReef software suite as a tool for system and network administrators. In Proceedings of the LISA 2001 15th Systems Administration Conference, Dec. 2001.

V. Paxson. Bro: A system for detecting network intruders in real-time. Computer Networks (Amsterdam, Netherlands: 1999), 31(23-24):2435-2463, 1999.

M. Roughan, S. Sen, O. Spatscheck, and N. Duffield. Class-of-Service mapping for QoS: A statistical signature-based approach to IP traffic classification. In ACM SIGCOMM Internet Measurement Conference, Taormina, Sicily, Italy, 2004.

Xu, Z.-L. Zhang, and S. Bhattacharyya. Profiling Internet backbone traffic: behavior models and applications. In Proceedings of ACM SIGCOMM 2005, pp. 169-180, 2005.

S. Zander, T. Nguyen, and G. Armitage. Self-learning IP traffic classification based on statistical flow characteristics. In Proceedings of the Sixth Passive and Active Measurement Workshop (PAM 2005), Apr. 2005.

\* cited by examiner

MANAGING NETWORK TRAFFIC FOR IMPROVED AVAILABILITY OF NETWORK SERVICES

BACKGROUND OF THE INVENTION

1. Field of the Invention

The invention relates to a lightweight application classification scheme. In particular, the invention applies supervised machine learning techniques to the problem of network traffic classification for identifying causal applications of traffic flows in the management of network services.

2. Background of the Related Art

The continual growth and evolution of applications, hosts, and networks have been the hallmark of the Internet. This hallmark is expected to be typical of the next generation Internet. On the one hand, such a high level of continuous development has been a challenge for network management. On the other hand, network monitoring and measurement have been widely used in understanding how well the networks performs and ensuring certain levels of Quality of Service (QoS) specified in the Service Level Agreements (SLAs) with customers.

Despite a wide range of work on this in the past, the classification of network traffic continues to be a challenge. See, for example: In particular, network traffic classification is a complicated multi-factor system involving the mutual interaction of a range of networks, hosts, applications and protocols. Furthermore, there are harsh requirements on system performance and robustness before this class of methodology can be implemented and deployed for practical applications.

Traffic application classification is an essential step in the network management process to provide high availability of network services. However, network management has seen limited use of traffic classification because of the significant overhead of existing techniques. Accordingly, it would be beneficial to provide a lightweight, i.e., low overhead traffic classification scheme based on readily available records.

SUMMARY OF THE INVENTION

The present invention focuses on one of the essential network measurement primitives—network traffic classification, which provides inputs to a wide range of important network management tasks including network planning, traffic engineering, accounting and billing, and anomaly detection and mitigation.

Internet network management has developed in parallel with an Internet that has seen continual growth in the variety and number of applications, networks, and hosts. In response to such continual development, network management preferably provides a wide range of services, such as performance guarantees, network planning, and long-term traffic modeling, alongside day-to-day activities of anomaly detection and mitigation. Motivated by this wide range of needs, the present invention simultaneously provides a useful method for lightweight application classification. The approach of the present invention to application classification is based upon flow-level statistics using standard NetFlow records. Alongside allowing a low-overhead, widely applicable identification mechanism, NetFlow records are commonly available to network operators. Use of the present invention has demonstrated that significant improvement may be made through the introduction of derivative features computed in a straightforward way from standard NetFlow values. Further, the Examples have illustrated that the approach according to the present invention accurately functions across a range of NetFlow sampling rates.

A method of managing network traffic to improve availability of network services including classifying network traffic flows using flow-level statistical information and a machine learning estimation based on a measurement of at least one of relevance and goodness of network features. Also, determining a network traffic profile representing applications associated with the classified network traffic flows. Additionally, managing network traffic using the network traffic profile.

Additionally, the invention includes a computer-readable medium comprising instructions, wherein execution of the instructions by at least one computing device manages network traffic to improve availability of network services by classifying network traffic flows using flow-level statistical information and a machine learning estimation based on a measurement of at least one of relevance and goodness of network features. Also, determining a network traffic profile representing applications associated with the classified network traffic flows. Additionally, managing network traffic using the network traffic profile.

Further, the invention includes a system for managing network traffic to improve availability of network services. The system includes a network router for collecting network traffic flow information and a data measurement tool or device coupled to the network router. The data measurement device classifying network traffic flows using flow-level statistical information and a machine learning estimation based on a measurement of at least one of relevance and goodness of network features. Also, determining a network traffic profile representing applications associated with the classified network traffic flows. Additionally, managing network traffic using the network traffic profile.

The flow-level statistical information can include packet-trace information and is available from at least one of Cisco NetFlow, NetStream or cflowd records. Further, the classifying of network flows can further include tagging packet-trace flow record data based on defined packet content information. The classifying of network flows can result in the identification of a plurality of clusters based on the measurement of the relevance of the network features. The measurement can be calculated in accordance with:

$$U(A_i, C) = 2 \frac{H(A_i) + H(C) - H(A_i, C)}{H(A_i) + H(C)}$$

wherein $H(\cdot)$ is the entropy function and C is the flow class. Additionally, the network traffic can be classified using a correlation-based measure to determine the goodness of the network features. The correlation-based measurement can be calculated in accordance with:

$$\sum_{A_j \in S} U(A_j, C) \Big/ \sqrt{\sum_{A_i \in S} \sum_{A_j \in S} U(A_i, A_j)}$$

The classification of network flows can compare at least two of the baseline feature set; the entire feature set, the entire feature set excluding srcIP/dstIP, the entire feature set excluding srcIP/dstIP, sTime, eTime and tcpFlag; and the feature set derived from the algorithm. The feature set derived from the algorithm can include at least low-port, tos and tcpFlag features.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE PREFERRED EMBODIMENTS

Figure 1:
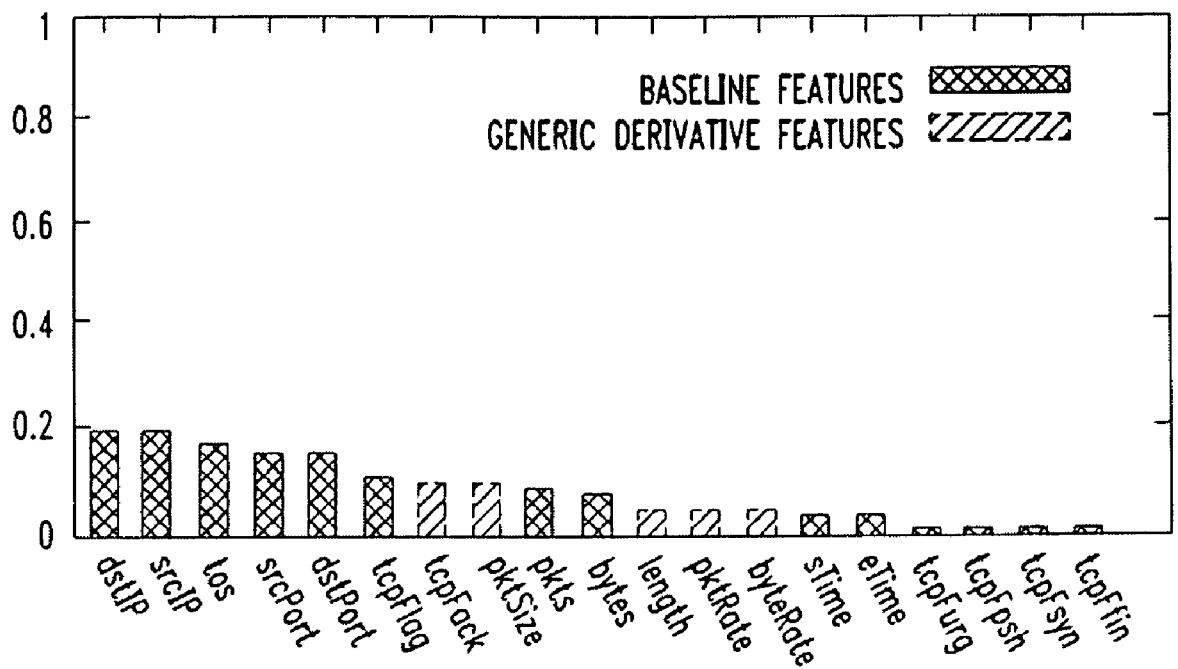
FIG. 1 is a bar graph illustrating symmetric uncertainty of the features according to the present invention.

According to the present invention, a lightweight, low overhead and low-cost mechanism of classification provides network application information with a considerably high accuracy, which is useful in effective network management. In the present invention, network traffic is monitored utilizing NetFlow records, which are created from packet-trace data and pre-tagged based upon packet content. This provides NetFlow records that are tagged with a high accuracy for ground-truth. Meaning the tagging accurately pertains to the specified application. In the accompanying Examples, it has been shown that NetFlow records can be usefully employed for application classification and management of network traffic. These Examples have demonstrated that the machine learning technique, according to the present invention, is able to provide a high identification accuracy (≈91%) that, while a little lower than that based upon previous packet-based machine learning work (>95%), is significantly higher than the commonly used port-based approach (50-40%), while requiring significantly less network resources to achieve this result. Trade-offs such as the complexity of feature selection and packet sampling are provided in the present invention and illustrated in the Examples.

Flow-Level Traffic Classification and NetFlow Data

The classification of network traffic has been performed previously using network features or features derived from streams of packets. Such feature-collections are often huge (200+ features) and range in complexity from Fourier-Transformations and quartile statistics to mean and variance of packet inter-arrival time and the number of TCP SACK packets. In such cases all the packets must be observed for the statistic to be usefully computed, however the classification accuracy has been shown to be very good (e.g., >95%). The disadvantage of this approach has been the complexity and costs associated with the collection, aggregation, and generation of the desired packet-derived features, which is a significant factor impeding the wide deployment of the proposed techniques.

In contrast, extensive vendor support has meant flow-level statistics, such as those provided by Cisco NetFlow™, are widely available. For example, packet and timer counts, timestamps or protocol and transmission data. Such data have been used for accounting and billing, and more recently has seen increased use for anomaly detection and capacity planning. Accordingly, it would be advantageous if NetFlow information sufficient to accurately classify network traffic were utilized in management of network traffic flows, including the application packets and transmittal information.

NetFlow refers specifically to the Cisco implementation of packet-trace statistics and the equivalent approaches include the NetStream™ approach of Huawei™ and the cflowd approach of Juniper™. Throughout this specification, all such flow-level information generally is referred to as NetFlow. The NetFlow system is embodied in many commercial routing products and is a source of data in common use by network operators.

NetFlow systems can be adjusted to be low in overhead, which we term as lightweight or low-cost approaches, compared to packet level monitoring. Furthermore, there is negligible extra operational burden on using NetFlow data for new applications. A number of the larger ISPs regularly collect many terabytes of NetFlow data each year and archive them for long-term planning purposes allowing the prospect of network archeology to further understand the changing application mix.

For example, Cisco NetFlow may be one of the most widely used traffic monitoring tools/devices in the Internet today. NetFlow generates flow statistics of traffic flowing through a router. In NetFlow v5, the most common version, a flow is defined as a unidirectional sequence of packets between a particular pair of source and destination IP addresses. For each flow, NetFlow maintains a record in the router memory containing a number of fields including the source and destination IP addresses, source and destination port numbers, inbound and outbound network interfaces, transport protocol, IP type of service, flow starting and finishing timestamps, cumulative transmission control protocol (TCP) flags and the number of bytes and number of packets transmitted.

Later NetFlow versions contain additional fields, such as MPLS labels and flexible templates for flow definition in NetFlow v9. Upon timeout of a flow record cache, a UDP/IP packet is generated and forwarded to a NetFlow collector, which processes and stores the NetFlow records. As obtaining and maintaining NetFlow data may also be computationally expensive for routers, especially in high-speed networks, packet sampling, either deterministic or random, can be applied.

The present invention incorporates the taxonomy used with the Class of Service (CoS) mapping-work, which can handle packets from different classes differently in order to ensure certain levels of drop rates or performance are maintained. The nature of each Internet application allows a wide variety of services to be divided into several discrete categories, for example, web-browsing, multimedia, telephony (VoIP), email activities, peer-to-peer and FTP file transfers, and malicious traffic (e.g., worms).

The approach, according to the present invention, preferably uses the full features of a NetFlow record, including ports and IP addresses. The present invention advantageously utilizes a site-specific approach to provide a system as fulfilling an important position among identification methodologies.

One application of this invention is the identification and tracking of the behavior of hosts to better recognize anomalies. Another application is in the monitoring of SLAs between two parties in an outsourcing arrangement. In such an arrangement, it is in both parties' interests to ensure that the behavior of the party stays within the agreed operating terms. The techniques provided by the present invention result in a low-overhead mechanism to allow for system roles to be identified prior to such an agreement, and then allow issues such as a changing mix of the applications to be identified at an early stage.

1. Naïve Bayes Classification and Kernel Estimation: Advantageously, in the present invention a machine learning estimation technique using contemporary naïve Bayes classification and kernel estimation applied to at least one Net-Flow flow record for the purpose of classification. The flow record may thus be considered as a series of data samples $x=\{x_1, \ldots, x_n\}$, which is a realization of $X=\{X_1, \ldots, X_n\}$. Each random variable $X_i$ is described by m features $(A_1, \ldots, A_m)$ that can take numeric or discrete values. Chosen from the features are a set of discriminators (also referred to as attributes) that are utilized for classification. Assume that there are k known classes of interest, represented by $C=\{c_1, \ldots, c_k\}$. Each class is characterized by a distribution function, $f(\cdot|c_j)$, which describes the membership characteristics of class $c_j$ over the defined features. Given an unobserved flow y, the posterior probability that y belongs to class $c_j$ can be calculated, according to Bayes rule, as follows:

$$p(c_j|y) = \frac{p(c_j)f(y|c_j)}{\sum_{c_j} p(c_j)f(y|c_j)},$$

where $p(c_j)$ denotes the prior distribution of being in class $c_j$. The posterior probability being the probability applied to new flow not used as training data that was previously captured or used for calculation purposes.

The goal of supervised traffic classification is to estimate $f(\cdot|c_j)$ given some training set x. By assuming the form of multidimensional Gaussian mixtures (with inherent independence assumption across features), the naïve Bayes kernel approach estimates $f(\cdot|c_j)$ by fitting over the training data. The estimation of the real density $f(\cdot|c_j)$ is hence given by $$\hat{f}(t|c_j) = \frac{1}{n_{c_j} h} \sum_{x_i \in c_j} K\left(\frac{t-x_i}{h}\right),$$

where h is called the kernel bandwidth and K(t) is a kernel distribution, e.g., standard Gaussian density $$K(t) = \frac{1}{\sqrt{2\pi}} \exp(-t^2/2), -\infty < t < \infty,$$

for numeric values, and uniform density $K(t)=\frac{1}{2}1(-1 \leq t \leq 1)$ for discrete values. In this way, $K(t)=0$ when $t>-1$ or $t<-1$ and $K(t)=0.5$ when $-1 \leq t \leq 1$. As in the kernel bandwidth h was set in the present invention as in the default value of the WEKA software suite of I. H. Witen and E. Frank, Data Mining, Morgan Kaufmann Publishers, 2000, which was used to perform calculations in the present invention.

Despite a greatly reduced number of features in the Net-Flow records (in contrast to packet-derived features), in the present invention it remains important to eliminate irrelevant, as well as redundant, features for the set of features that individually correlate well with the class but have little intercorrelation. The relevance measures whether one feature of an application gives the most or best information regarding that portion of the application to which the flow should be associated. Accordingly, the present invention utilizes the symmetric uncertainty measure to rank the relevance of the features:

$$U(A_i, C) = 2\frac{H(A_i) + H(C) - H(A_i, C)}{H(A_i) + H(C)}$$

where $H(\cdot)$ is the entropy function, and C is the flow class (considered as a feature). It should be noted that symmetric uncertainty always lies between 0 and 1. Furthermore, the present invention uses the correlation-based measure to determine the goodness of any given subset, S, of the features:

$$\sum_{A_j \in S} U(A_j, C) \bigg/ \sqrt{\sum_{A_i \in S} \sum_{A_j \in S} U(A_i, A_j)}$$

By adding features sequentially in decreasing order of symmetric uncertainty and monitoring the amount of increase in the goodness measure, the desired set of features can be selected. The goodness measures whether a set of features of an application gives the most or best information regarding that portion of the application to which the flow should be associated. Goodness includes the disparity of the different features in the set as well as the relevance of each individual feature.

2. Evaluation Dataset and NetFlow Generation: The present invention uses data collected by a high-performance network monitor, such as that disclosed in A. Moore, J. Hall, C. Kreibich, E. Harris, and I. Pratt, Architecture of a network monitor, In *Proceedings of Passive & Active Measurement Workshop* 2003 (pam2003), La Jolla, Calif., Apr. 2003. Loss-limited, full-payload capture to disk providing time-stamps with resolution of better than 35 nanoseconds is also used in the present invention. The site examined a host's several Biology research facilities, and collectively employs about 1,000 researchers, administrators and technical staff. This site is connected to the Internet via a full-duplex Gigabit Ethernet link. It was on this connection to the Internet that the monitor was placed. Traffic was monitored for each traffic-set consisting of a full 24-hour, weekday period and for both link directions. Further details regarding this data set are provided in A. W. Moore and D. Papagiannaki, Toward the accurate identification of network applications, in *Proceedings of the Sixth Passive and Active Measurement Workshop (PAM 2005)*, volume 3431, Springer-Verlag LNCS, 2005.

The manner of sampling consists of taking several fixed-length periods from randomly placed, non-overlapping periods throughout a 24-hour day. A more comprehensive description of such a sampling mechanism is described in A. W. Moore and D. Zuev, Internet traffic classification using Bayesian analysis techniques, in *Proceedings of ACM Sign-metrics*, Section 5.1, pages 50-60, 2005.

This collection of traffic data was hand-classified into a number of application classes including web browsing (WWW), Email, Bulk, Attack, P2P, Database, Multimedia, Service, Interaction, and Games. Overall, the experimental dataset contains over 48.8 million IP packets that constitute about 0.8 million TCP flows and 3.5 million UDP/ICMP flows in total. While the accuracy of classifying TCP flows was focused on, all IP data was used as input to provide for the most realistic NetFlow flow-cache behavior possible.

To obtain NetFlow records from the packet traces collected, the present invention utilizes nProbe, a software implementation of Cisco NetFlow. The nProbe provides a flexible PC-based implementation of NetFlow and allows the use of trace data (e.g., pcap packet-trace files) as input, which permits repeatability of experiments. In this way, packet-traces can be fed to nProbe and flow records can be collected with different settings of packet sampling rates. In the examples according to the present invention, the number of cache entries was set to 65,536, which corresponds to the default value in Cisco 7200 series and 7500 series routers, and the cache timeout interval (for both active and inactive flows) was set to be 60 seconds, which corresponds to the configuration in a Tier-1 ISP network that was surveyed. It was presumed that there was no loss between nProbe and the NetFlow collector.

It was determined that not all fields in the nProbe output are meaningful, such as the inbound and outbound interfaces. In addition the transport protocol field was also excluded as these examples were restricted to TCP flows (97%, by volume of the total dataset). Table 1 summarizes the substantial features in the raw flow records. In addition, these Examples also explore a set of derivative features of the present invention, as also described in Table 1.

TABLE 1

Baseline features and derivative features in the flow records.

| | Explanations |
|---|---|
| Baseline features | |
| srcIP/dstIP | source/destination IP address |
| srcPort/dstPort | source/destination port address |
| tos | IP type of service |
| sTime/eTime | flow start/end timestamp |
| tcpFlag | cumulative OR of TCP flags |
| bytes | total number of bytes observed |
| pkts | number of packets observed |
| Derivative features | |
| length | duration of flow (eTime − sTime) |
| pktSize | average packet size (bytes/pkts) |
| byteRate | average flow rate (bytes/length) |
| pktRate | average packet rate (pkts/length) |
| tcpFxxx | xxx = syn/ack/fin/rst/psh/urg flag |

EXAMPLES

3. EVALUATION AND IMPROVEMENT: In these Examples, the Bayes and kernel estimation technique were applied to the NetFlow records for application identification to demonstrate the feasibility of the invention. In the Examples, a number of questions have been answered: (1) Does this technique accurately identify the applications? (2) Is there room to further improve its accuracy? (3) Can the computational complexity be bound without affecting its accuracy? (4) Is it robust if the flow records are obtained at a low sampling rate? The purposes of these Examples are to demonstrate that the classification techniques of the present invention are effective, and to investigate the tradeoffs between the accuracy of classification and the complexity/overhead of the NetFlow system, as utilized in the present invention.

4. BASELINE EXPERIMENTS—In the baseline experiment, a straightforward approach is taken in exploring only the baseline features in the flow records. Unless otherwise noted, the dataset is split randomly into two subsets of equal size, with one of them being used as the training data and the other to test the accuracy of the classification. As the objective is to identify the type of applications for each flow, the accuracy is measured by the percentage of flows correctly classified. The result was positive, demonstrating an accuracy of classification of about 88.3%. This accuracy is already significantly higher than that of industry standard techniques that use the TCP port number to achieve an accuracy of only 50-70%, although it is lower than the accuracy of classification techniques based upon contemporary packet-derived features (>95%). The reason for this lower accuracy may be due to insufficient information in a tuple alone to differentiate some application types. For example, Voice-over-IP traffic using port 80 may be confused with web traffic.

To understand which features are more relevant, the symmetric uncertainty values of all features are calculated in accordance with FIG. 1 in descending order. The derivative features in Table 1 are also shown in this figure but will be explained below. As expected, the port numbers, type-of-service, and cumulative TCP flag all appear highly relevant. Significantly, the IP addresses also show high relevance. This is due to that the IP addresses often reflect role-specific information on the placement of the services, e.g., one machine is a mail server and another is a web server.

5. GENERIC DERIVATIVE FEATURES: Along with the baseline features, FIG. 1 also shows high symmetric uncertainty values for several derivative features: tcpFack, pktSize, and length, as described in Table 1. The present invention makes it possible to improve the performance by using derivative features in data classification, the result of this experiment in obtaining only an improved accuracy value of 89.06% is disappointing. It is emphasized, however, that the observed improvement in accuracy is insignificant and the lower accuracy value may possibly be an artifact from this particular dataset. It is believed that the derivative features are derived using only simple (albeit non-linear) mathematical operators, and so they may not carry significantly more information than the baseline features. For instance, pktSize is derived from the number of bytes and the number of packets.

A specific example of the improvement in accuracy provided by derivative features is the addition of tcpFack. This is a single bit representing the presence/absence of the TCP ACK flag on data packets within a flow during a cache timeout interval. This flag allows a differentiation of the Email and Bulk traffic classes from the web browser traffic class, as the former two classes tend to have little full-duplex activity, hence no ACK, in the client-to-server direction.

6. APPLICATION-AWARE DERIVATIVE FEATURES: While the baseline experiments reveal the effectiveness of the classification technique of the present invention, using the above described derivative features, tcpFack, pktSize, and length, which are listed in Table 1, it is also possible to derive more meaningful features by understanding how different applications lead to different characteristics in NetFlow records. This Experiment gives an example using the TCP port number. It is believed that this general approach of exploring knowledge of the applications, in accordance with the present invention, can also be applied to derive other meaningful features to further improve accuracy.

Prior work on application identification has frequently used the number to obtain a reasonable accuracy at 50-70%. In the IANA port allocation it is a common practice for the ports numbered 1-1025 to refer to specific privileged services and protocols. For instance, web servers typically use port 80 as the listening port to accept client connection requests, while a client program may take any random port number, which must be large (e.g., larger than 1024). Hence, the smaller port number of a flow, more likely used by a server, is considered more informative in traffic classification. This feature is referred to as the "low port" and the larger port number of the flow is referred to as the "high port".

Figure 2:
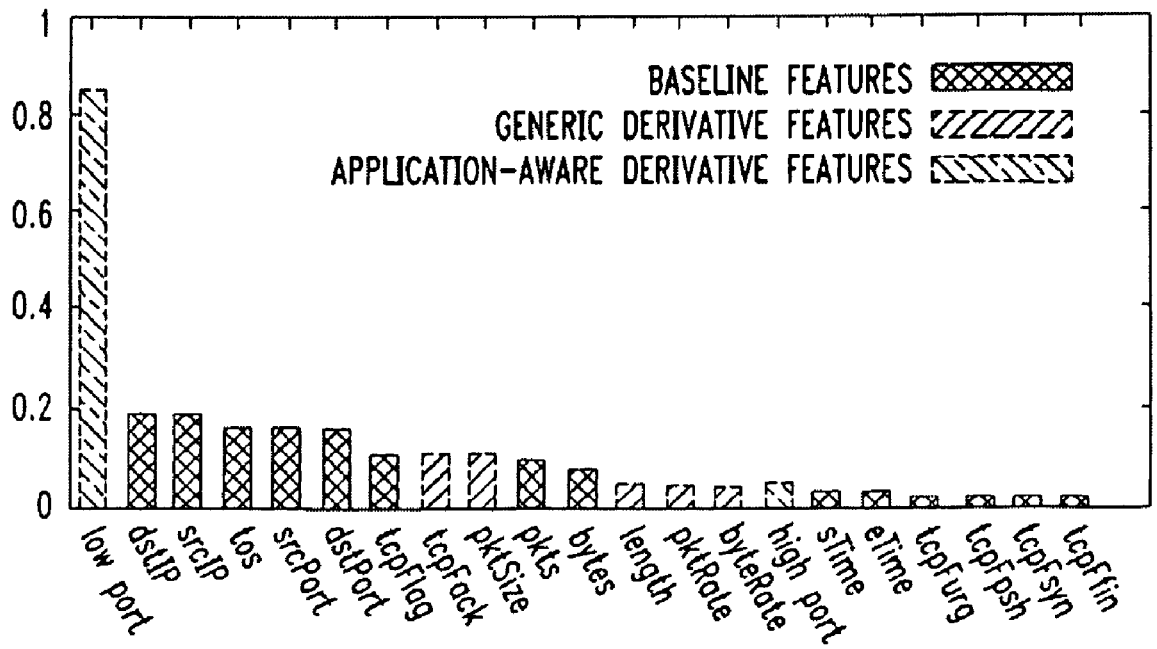
FIG. 2 is a bar graph illustrating symmetric uncertainty of all features, including "low port" and "high port" according to the present invention.

The relevance of these two features is best illustrated in FIG. 2, which highlights their symmetrical uncertainty values among those from FIG. 1. The low port becomes a predominant feature. Its symmetrical uncertainty, and thus its entropy, is at least four times larger than those of the other features. This result is consistent with prior traffic classification efforts that have relied upon this feature. Meanwhile, the symmetrical uncertainty of the high port is only 0.04, and thus may contribute much less to improving the accuracy of classification. Nevertheless, the specific inclusion of these two features in the feature set leads to an improved accuracy of 91.4%, or interpreted in another way, approximately a 20% reduction in the number of misclassifications. It is believed that this level of improved accuracy utilizing the technique of the present invention is due to the accuracy already being relatively high using the kernel estimation technique, leaving little room for improvement (classification using the more comprehensive feature-set derived from streams of packets yields only a 95% accuracy).

7. REDUCING FEATURE COMPLEXITY: The computational complexity of many traffic classification techniques, in relation to both sampling overhead and classification algorithm complexity, can be high due to the large number of features and the large size of the dataset. In many applications, reducing this complexity is desirable if the impact on the accuracy of classification is negligible, although for offline classification tasks, it is not an unacceptable tradeoff to tolerate a longer processing time for a marginally improved accuracy. In the next two Examples, this problem is approached from both directions: reducing the dimensionality (i.e., number of features), and reducing the dataset size (i.e., number of flows).

The inclusion of the derivative features may suggest that many features become redundant. For example, the starting time and the ending time of a flow may no longer be important once the derivative "flow length" is obtained. The cumulative TCP flags may not be useful either since variables are used to represent each individual flag. In addition, some features, such as the source and destination IP addresses, may be particularly site-dependent, which one may opt to omit in the feature set. While these features may be excluded to reduce time complexity, the objective of maintaining the accuracy of classification is minimally affected. Accordingly, in these Examples, the following feature sets are compared: (1) Baseline features; (2) all features; (3) all features excluding srcIP/dstIP; (4) all features excluding srcIP/dstIP, sTime, eTime and tcpFlag; and (5) a compact set of features determined by the feature selection algorithm, as described in Section 1.

$$\sum_{A_j \in S} U(A_j, C) \Big/ \sqrt{\sum_{A_i \in S} \sum_{A_j \in S} U(A_i, A_j)}$$

Figure 3:
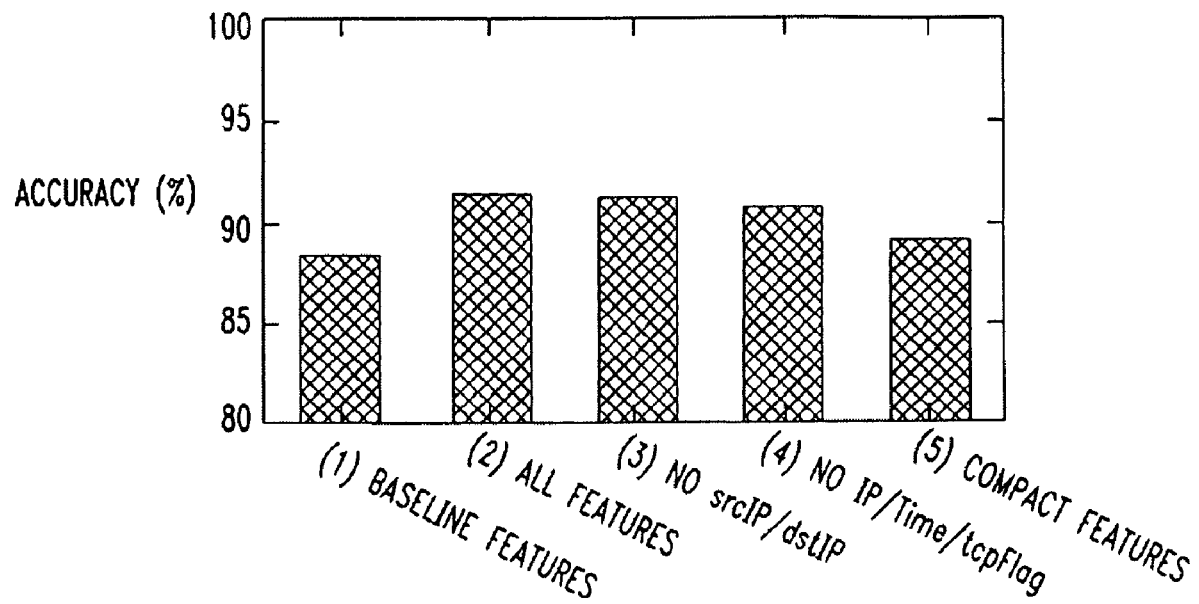
FIG. 3 is a bar graph illustrating accuracy of classification with reduced features, according to the present invention.

FIG. 3 shows the accuracy of the classification result according to the present invention. It is observed that the accuracy remains reasonably high by removing irrelevant and redundant features, while the running time of the kernel estimation algorithm is greatly reduced—from about 30 using the "all-features" set (2) to less than 30 minutes using the "compact feature" set (5) with three features ("low port", "tos", and "tcpFlag") under the same hardware/software settings.

Figure 4:
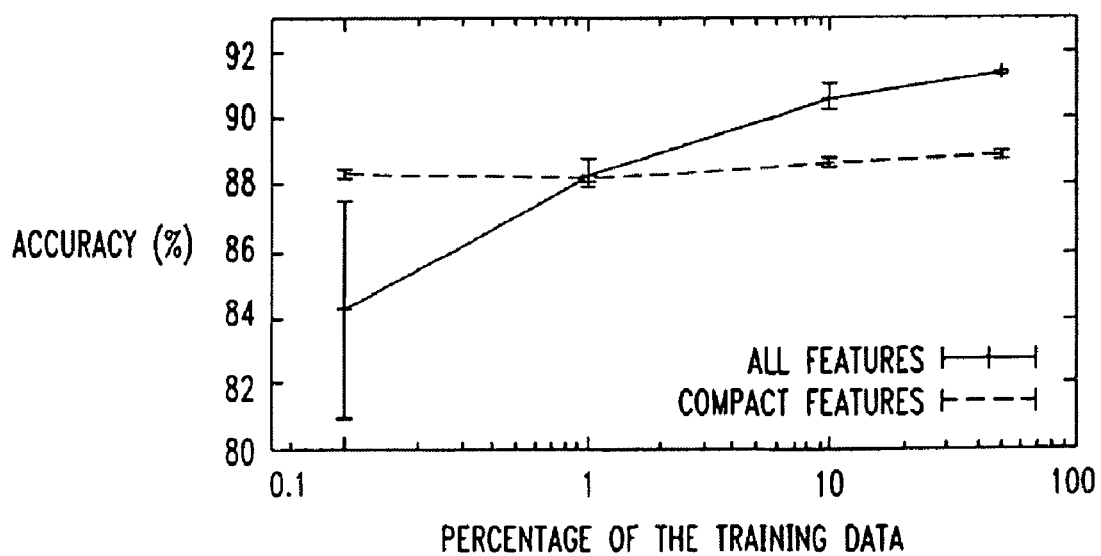
FIG. 4 is a graph charting training set size versus accuracy according to the present invention.

8. REDUCING THE TRAINING-SET SIZE: The use of a small training set can be critical in an environment where the (manual) classification of a large quorum of data is impractical. FIG. 4 illustrates the relationship between the size of the training set and the accuracy of the classification approach of the present invention. The accuracy value is the average from 10 experiments with different seeds. Most notably, despite varying the training set through three orders of magnitude, the accuracy of the classification process varies by less than 8%. The results illustrated provide confidence in the method of the present invention as a useful and accurate mechanism for the tracking of host behavior using a relatively small set of training data.

FIG. 4 may appear to be counter-intuitive. However, the increasing accuracy of the results is proportional to a combination of the size of the training set and the number of features. This may be identified as caused by the (relatively) small number of flows that are not (clearly/uniquely) identified by the features of the compact feature set. The inclusion of a number of additional features along with the inclusion of a number of samples to allow both differentiation of these previously unclearly defined flows and a minimization of the misclassification of other flows leads to an increasing accuracy once the training set contains a sufficient number of samples. The low accuracy of the wide-range of features when the training data does not provide sufficient coverage is caused by the inverse effect: the large error bar results from the sample of data simply not providing a sufficiently representative sample when the classifier is exposed to all features. This leads to misclassification and the level of (in)accuracy noted above.

9. IMPACT OF PACKET SAMPLING: Packet sampling is a common practice in operational use of NetFlow. Sampling mechanisms are often implemented in hardware to reduce the impact upon both router and NetFlow infrastructure. In contrast to previous sections where no packet sampling occurs, in the present invention, nProbe is preferably configured to extract flow records based upon packet sampling.

Figure 5:
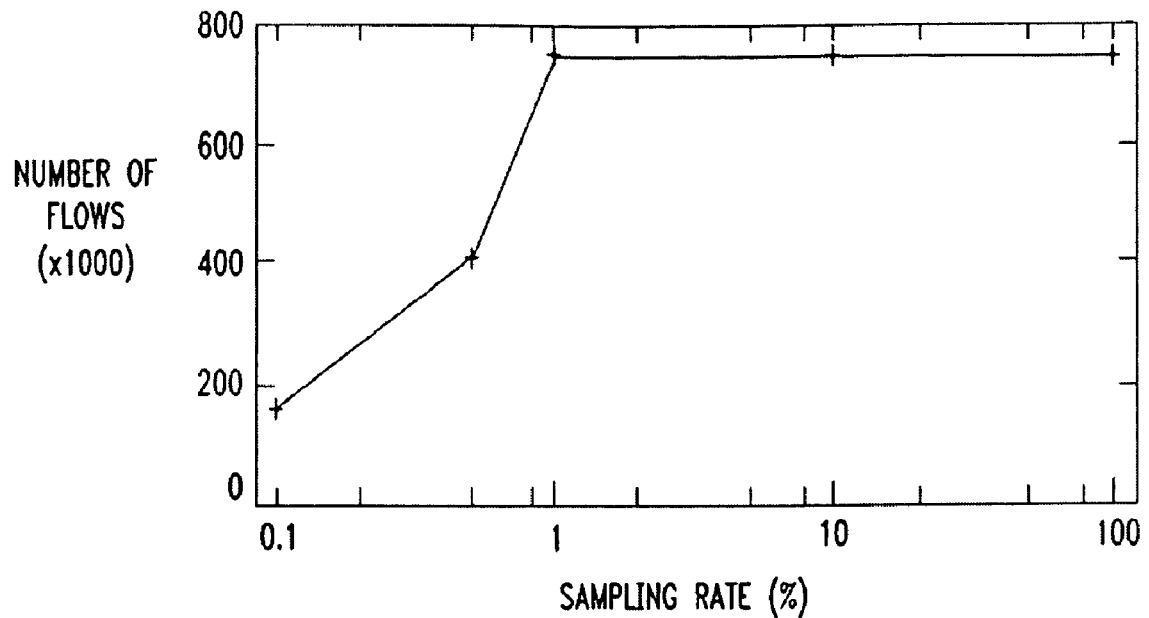
FIG. 5 is a graph charting number of flows observed by varying packet sampling rate according to the present invention.

While packet sampling, e.g., even at a light sampling rate of 1% or 10%, may dramatically reduce overhead at routers, especially in high-speed networks, it is unclear whether such sampling has a negative impact on the accuracy of the flow classification techniques of the present invention. To that end, the following experiment was conducted. First, as shown in FIG. 5, the numbers of collected flows vary with the packet sampling rate. Overall, packet sampling does not result in a significantly smaller number of obtained flows. For instance, at the 0.1% sampling rate, nProbe still outputs 20% of the maximum number of flows obtained when no sampling is used.

Figure 6:
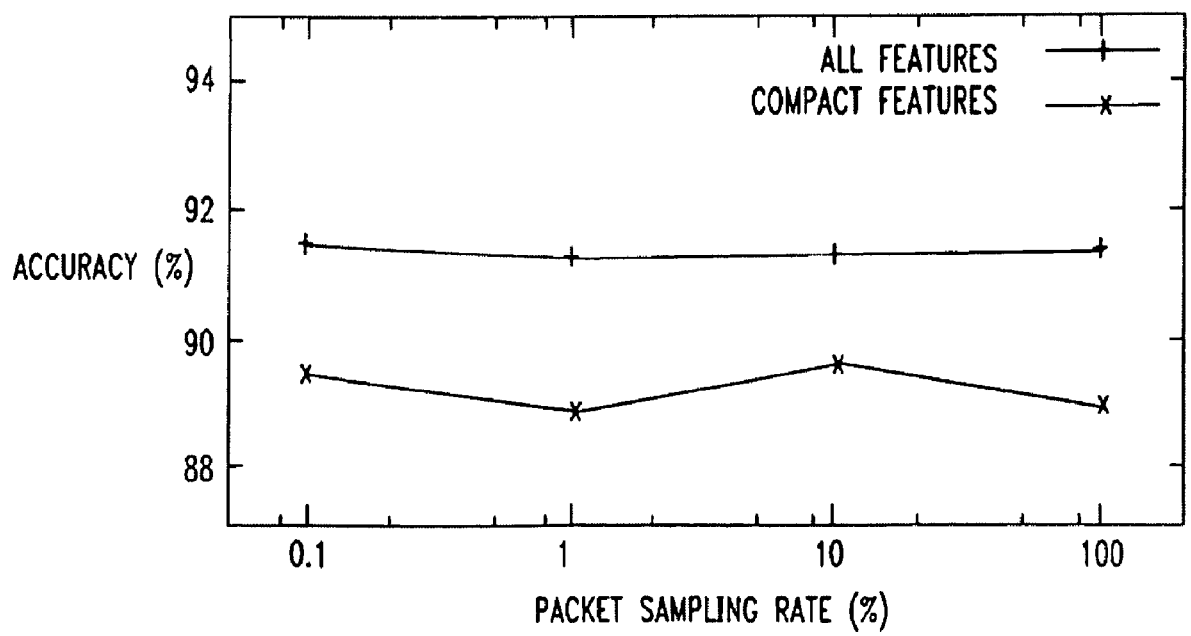
FIG. 6 is a graph charting accuracy of two classification methods when the packet sampling rate varies according to the present invention.

The classification technique of the present invention was then tested using the flow records collected at different sampling rates. FIG. 6 shows how accuracy varies with the sampling rate for two feature sets: (1) The all-features set, and (2) The compact feature set. The results show that the use of packet sampling does not significantly affect the kernel estimation technique. A useful observation from FIG. 6 is that when sampling rate is very low, e.g., 0.01%, the accuracy of classification is slightly higher. This, however, is because of an artifact of packet sampling—when sample rate is very low, a more homogenous set of large flows can survive the sampling, which perceivably leads to more accurate classification. This also suggests that one should be cautious in using flow characteristics derived by NetFlow data with packet-sampling enabled, as the result may be biased.

10. CONCLUSIONS: While the classification technique of the present invention is site-specific, use of the present invention fulfills a useful and unique role among identification methodologies: for example, site-specific bias is ideal if operators wish to identify anomalies in the behavior of server systems. The precise identification and low-overhead monitoring of system roles according to the method of the present invention could be applied to the monitoring of SLAs for outsourcing agreements.

Thus, the present invention is an effective low-overhead methodology that has a number of valuable uses. It is believed that adaptive learning and classification schemes like the present invention are needed to enable and maintain solutions in network management, such as traffic engineering, anomaly detection, and dynamic application-centric resource control in the next generation Internet.

Noting that the use of additional features of the present invention has proved valuable, it would also be advantageous to implement templates and other enhanced features and extensions to the commonly used NetFlow v5 implementation. Moreover, it is recognized that the use of machine learning methods, including naïve Bayes classification and kernel estimation, in the present invention can be improved and it is foreseen that methods such as a combination of C4.5 decision-trees (which is a type of data structure) and boosting (which is a process for fitting or adding more information into a decision tree) would provide a contrasting approach: one based only upon the existence of samples and not weighted by evidence-based probabilities. Application models that encapsulate site-independence would clearly be advantageous, but even models that encapsulate varying time-dynamics would be useful. An example application of this might be an application-specific classifier as anomaly detector. Such a model would permit the identification of behavior, normal for one time of the day, but peculiar at another period.

With information about both the decay of properties of any classifier and of the effectiveness of a classification scheme across multiple locations, it would become clear precisely what the trade-off is between training complexity and wide-ranging application. For example, the trade-offs between the complexity of a data model and the functionality of the application differentiation provided.

Thus, while the preferred embodiments of the present invention have been described with reference to the accompanying drawings, it is to be understood that the invention is not limited to those precise embodiments and that various other changes and modifications to the invention may be affected by one skilled in the art without departing from the scope or spirit of the invention, and that it is intended to claim all such changes and modifications that fall within the scope of the invention.

What is claimed is:

1. A method of managing network traffic to improve availability of network services comprising:
    classifying network traffic flows using flow-level statistical information and a machine learning estimation, the network traffic flow classification based on a measurement of at least one of a relevance and a goodness of network features;
    determining a network traffic profile representing applications associated with the classified network traffic flows; and
    altering the network traffic flows for managing network traffic using the network traffic profile wherein the classifying of network flows results in the identification of a plurality of clusters based on the measurement of the relevance of the network features, wherein the measurement is calculated in accordance with:

$$U(A_i, C) = 2\frac{H(A_i) + H(C) - H(A_i, C)}{H(A_i) + H(C)}$$

wherein $H(\cdot)$ is the entropy function and C is the flow class.

2. The method of claim 1, further comprising:
    classifying network traffic using a correlation-based measure to determine the goodness of the network features, wherein the correlation-based measurement is calculated in accordance with:

$$\sum_{A_j \in S} U(A_j, C) \Big/ \sqrt{\sum_{A_i \in S} \sum_{A_j \in S} U(A_i, A_j)}.$$

3. The method of claim 2, wherein the classification of network flows compares at least two of the baseline feature set, the entire feature set, the entire feature set excluding srcIP/dstIP, the entire feature set excluding srcIP/dstIP, sTime, eTime and tcpFlag; and the feature set derived from the algorithm.

4. The method of claim 2, wherein the feature set derived from the algorithm includes at least low-port, tos and tcpFlag features.

5. The method of claim 1, wherein the flow-level statistical information includes packet-trace information and is available from at least one of Cisco NetFlow, NetStream or cflowd records.

6. The method of claim 1, wherein the classifying of network flows further comprises tagging packet-trace flow record data based on defined packet content information.

7. A system for managing network traffic to improve availability of network services, the system comprising:
    a network router for collecting network traffic flow information; and
    a data measurement device coupled to the network router, the data measurement device classifying network traffic flows using flow-level statistical information and a machine learning estimation, the network traffic flow classification based on a measurement of at least one of a relevance and a goodness of network features;
    determining a network traffic profile representing applications associated with the classified network traffic flows; and
    managing network traffic using the network traffic profile, wherein the classifying of network flows results in the identification of a plurality of clusters based on the measurement of the relevance of the network features, wherein the measurement of the relevance is calculated in accordance with:

$$U(A_i, C) = 2\frac{H(A_i) + H(C) - H(A_i, C)}{H(A_i) + H(C)}$$

wherein $H(\cdot)$ is the entropy function and C is the flow class.

8. The system as defined by claim 7, wherein the data measurement device further classifying network traffic using a correlation-based measure to determine the goodness of the network features, wherein the correlation-based measurement is calculated in accordance with:

$$\sum_{A_j \in S} U(A_j, C) \Big/ \sqrt{\sum_{A_i \in S} \sum_{A_j \in S} U(A_i, A_j)}$$

9. The system as defined by claim 8, wherein the classification of network flows compares at least two of the baseline feature set, the entire feature set, the entire feature set excluding srcIP/dstIP, the entire feature set excluding srcIP/dstIP, sTime, eTime and tcpFlage; and the feature set derived from the algorithm.

10. The system as defined by claim 7, wherein the flow-level statistical information includes packet-trace information and is available from at least one of Cisco NetFlow, NetStream or cflowd records.

11. The system as defined by claim 7, wherein the classifying of network flows further comprises tagging packet-trace flow record data based on defined packet content information.

12. A non-transitory computer-readable medium storing instructions, wherein execution of the instructions by at least one hardware computing device manages network traffic to improve availability of network services by:
classifying network traffic flows using flow-level statistical information and a machine learning estimation, the network traffic flow classification based on a measurement of at least one of a relevance and a goodness of network features;
determining a network traffic profile representing applications associated with the classified network traffic flows; and
managing network traffic using the network traffic profile, wherein the classifying of network traffic uses a correlation-based measure to determine the goodness of the network features, wherein the correlation-based measurement is calculated in accordance with:

$$\sum_{A_j \in S} U(A_j, C) \Big/ \sqrt{\sum_{A_i \in S} \sum_{A_j \in S} U(A_i, A_j)}.$$

13. The non-transitory computer-readable medium storing instructions defined by claim 12, wherein the flow-level statistical information includes packet-trace information and is available from at least one of Cisco NetFlow, NetStream or cflowd records.

14. The non-transitory computer-readable medium storing instructions defined by claim 12, wherein the classifying of network flows further comprises tagging packet-trace flow record data based on defined packet content information.

15. The non-transitory computer-readable medium storing instructions defined by claim 12, wherein the classifying of network flows results in the identification of a plurality of clusters based on the measurement of the relevance of the network features, wherein the measurement of the relevance is calculated in accordance with:

$$U(A_i, C) = 2\frac{H(A_i) + H(C) - H(A_i, C)}{H(A_i) + H(C)}$$

wherein $H(\cdot)$ is the entropy function and C is the flow class.

16. The non-transitory computer-readable medium storing instructions defined by claim 12, wherein the classification of network flows compares at least two of the baseline feature set, the entire feature set, the entire feature set excluding srcIP/dstIP, the entire feature set excluding srcIP/dstIP, sTime, eTime and tcpFlage; and the feature set derived from the algorithm.

17. The non-transitory computer-readable medium storing instructions defined by claim 12, wherein the feature set derived from the algorithm includes at least low-port, tos and tcpFlag features.

* * * * *